Patented Oct. 10, 1939

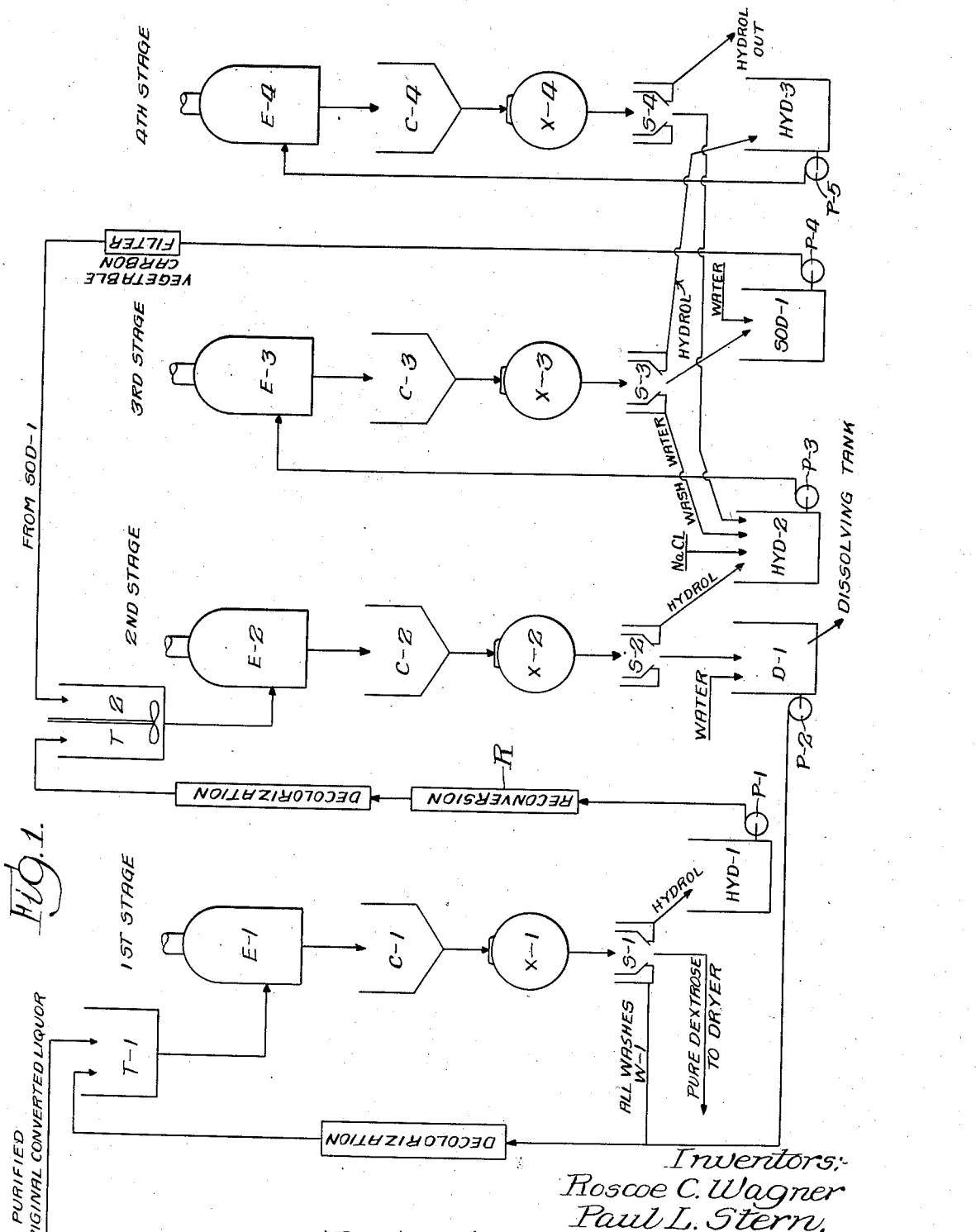

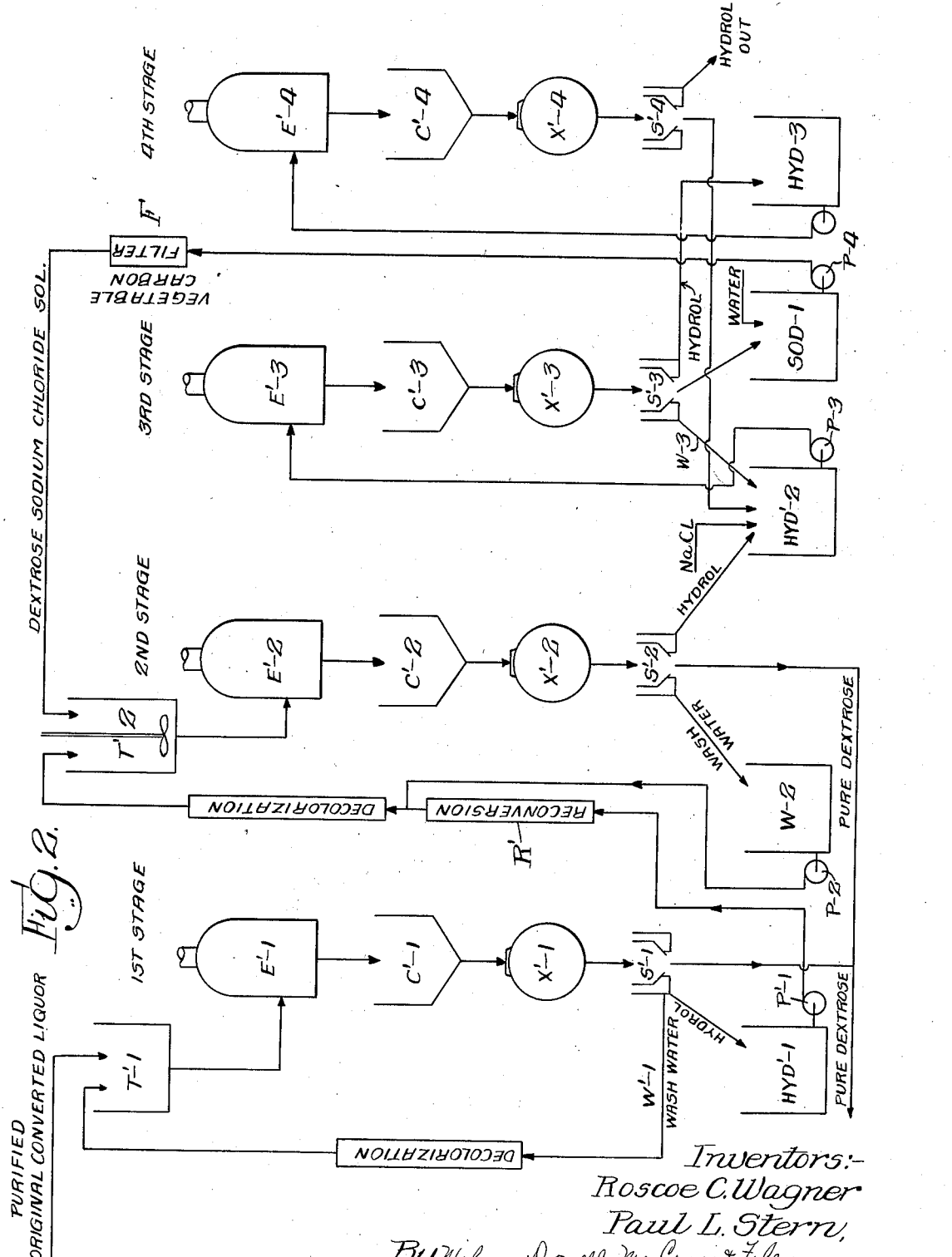

2,175,369

UNITED STATES PATENT OFFICE 2,175,369

MANUFACTURE OF DEXTROSE

Roscoe C. Wagner and Paul L. Stern, Clinton, Iowa, assignors to Clinton Company, Clinton, Iowa, a corporation of Iowa Application March 31, 1937, Serial No. 133,982

10 Claims. (Cl. 127—58)

This invention relates to the recovery of dextrose from impure solutions containing dextrose, such as solutions obtained from the hydrolytic conversion of starch, corn sugar molasses (hydrol) resulting from the separation of crystallized dextrose from solutions containing the latter, and any and all other dextrose-containing liquors no matter whether obtained originally or as intermediate products. It is contemplated that this invention may be utilized in obtaining dextrose from acid and/or enzyme converted starchy and/or carbohydrate material of grains such as rice, wheat, oats, rye, barley, corn or roots such as arrowroot, sago, cassava or tubers such as both white and sweet potatoes, or fruits, vegetables or woody substances capable of yielding dextrose upon hydrolysis, conversion, inversion and/or upon solution in water.

The invention is especially useful in the commercial production of dextrose, commonly referred to as corn sugar, from the concentrated syrup of converted corn starch. According to common practice in the industry heretofore, the corn starch was converted until there was produced a solution containing from 87% to about 91% of dextrose (dry basis). After the usual clarifying procedure, this solution was concentrated in vacuum pans to such a density as would induce crystallization of the dextrose, either in hydrous or anhydrous form as desired. After the dextrose had been crystallized and removed from the mother liquor by centrifugal separation usually, the filtrate or hydrol remaining contained a large proportion of dextrose and uncrystallizable substances, the latter making it exceedingly difficult to recover the dextrose from the hydrol. After the removal of the crystals obtained from the first crystallization of dextrose from an original starch converted sugar liquor, the hydrol might contain as much as 70% by weight of the dextrose which was present in the original sugar liquor. Even after recrystallization of the hydrol the final hydrol often contained sufficient dextrose in solution to make further recovery desirable.

By means of processes comprising the present invention, as high as 90% of the total dextrose contained in the original sugar liquor may with ease be recovered economically. By careful manipulation in accordance with the description of this invention, even 95% or more of the original dextrose may be recovered, if desired.

The primary object of the invention, therefore, is to provide a process for the recovery of dextrose from impure dextrose containing liquors which will yield economically a greater recovery of the dextrose from such liquors than has heretofore been customary.

Various other objects and advantages of the invention will be set forth hereinafter.

The invention may be best illustrated by describing its application to the recovery of dextrose from the well known dextrose containing liquids which are produced by converting corn starch by means of heat and acid into dextrose and other starch conversion products. Reference may be had to the United States Letters Patent No. 1,886,941 of George E. Corson and Arthur P. Bryant, issued November 28, 1932, for a general understanding of the starch conversion liquors referred to herein.

In the drawings:

Fig. 1 is a flow sheet diagram of one form of the invention as embodied in a process for making dextrose from corn starch conversion liquors; and Fig. 2 is a modified form of the invention.

In our invention herein described, advantage is taken of the well known fact that dextrose forms double salts with several halogen salts. One of these double salts, dextrose sodium chloride, having the formula $(C_6H_{12}O_6)_2.NaCl.H_2O$ is obtained by allowing a mixture of concentrated solutions of two mols of dextrose and one mol of sodium chloride to crystallize together, as was disclosed by V. Lippman in "Die Zuckerarten and Ihre Derivate" 1882, pp. 44–45. See also the discussion by Shinnosuke Matsuura in the Bulletin of the Chemical Society of Japan, 2, 44 (1927) in an article entitled "Equilibrium of the system: Dextrose-sodium chloride-water." As can be seen from the above formula 58.5 parts by weight of sodium chloride would combine with 360 parts by weight of dextrose, making the ratio of 16.2 parts of sodium chloride to each 100 parts of dextrose.

Referring now to Fig. 1 of the drawings which illustrates diagrammatically one form of the process, the tank T—I represents the storage tank for the crude dextrose liquors resulting from conversion of corn starch into dextrose and other modified forms of starch. Preferably the commonly employed conversion process which involves the use of hydrochloric acid will be used in connection with this invention, although other conversion processes may be used if desired and if they do not interfere with the efficient performance of the processes involved in the present invention.

It is assumed, of course, that the usual efficient and well known processes for clarifying the starch conversion liquor, as for example by means of bone char or vegetable carbon, will be employed also before crystallization of dextrose from the liquor is attempted.

When the starch conversion liquor has been suitably clarified and prepared for concentration, it will be accumulated in a storage tank, such as the tank T—1, together with certain wash water and redissolved crystalline dextrose, hereinafter mentioned. From the tank T—1 the mixture of dextrose-containing liquors will be conducted into the evaporator or vacuum pan E—1 where the usual evaporation will be conducted until the liquor attains a density favorable to an efficient yield of pure dextrose from the solution.

In accordance with the present invention the liquor will be concentrated to about 39.5° to 40.5° Bé., measured at 100° F. Upon leaving the evaporator at a temperature in the neighborhood of 135° to 140° F., it will be cooled rapidly to about 117° to 122° F., preferably 120° F., in the cooler C—1, which is a standard cooler having the usual agitator and coils for circulating cooling water. The cooling of the liquor to about 120° F. requires only about thirty minutes to one hour, depending on the capacity of the apparatus and the temperature of the water, after which the liquor is then introduced into the crystallizer X—1. At this temperature and at the existing density, melting of the seed in the crystallizer will be avoided and likewise sudden chilling of the liquor in the presence of seed is avoided.

As is customary, a small quantity of magma to act as seed, containing solid phase dextrose in the proportion of about 3% to 5% of the total amount of solid phase dextrose contained in a full crystallizer is left in the crystallizer from the preceding batch, and as the process produces hydrate dextrose this will be the type of crystal acting as seed.

As a further precaution to avoid sudden chilling of the incoming warm liquor, it is well to warm the seed by circulating water at 108° to 110° F. through the jacket of the crystallizer, accompanied by agitation for about two hours before the crystallizer is filled.

As the crystallizer is being filled and for two hours thereafter the agitation should be continued to insure thorough distribution of the seed throughout the liquor and the attaining of a more uniform temperature throughout the mass of liquor.

Thereafter for the next twenty-four hours the liquor should remain quiescent with the exception that about every six hours the agitator should be given about two complete revolutions to prevent crystals from adhering to the sides and bottom of the crystallizer to such an extent as to prevent rotation of the agitator.

After the first twenty-six hours, the agitation may then be conducted continuously at the usual rate of one revolution in two minutes until the magma is discharged when crystallization has been completed.

During about the first three days water having a temperature of 108° to 110° F. should be circulated through the jacket of the crystallizer and its rate of flow so regulated that the liquor is gradually and slowly cooled to about 110° F. at the end of three days. Thereafter during the remainder of the crystallization period, which lasts between six and seven days, the temperature of the water may be gradually lowered to about 88° F. which will cause the liquor to further cool slowly and gradually until it reaches about 93° to 95° F. at the end of the period.

While considerable exothermic heat results from the crystal growth, this heat, together with the heat remaining after evaporation and cooling, is conducted away in a gradual manner by the circulating water. By maintaining a rather high temperature during the first half of the crystallizing period, the supersaturation of the liquor is so regulated that new crystals do not form too rapidly so as to produce too much exothermic heat, nor too numerously so as to exhaust too extensively the dextrose content of the liquor in the form of crystal nuclei which would be incapable of being built up to a large enough size for satisfactory centrifuging. Under the procedure described, the number of new crystals formed, in conjunction with the crystals present in the seed, is sufficient under the conditions of supersaturation which are maintained by a slow and gradual lowering of the temperature to produce a large yield of crystals of size and shape satisfactory for good purging in the centrifugal separators. If, instead of using 108° to 110° F. water in the crystallizer during the first few days, cold water were circulated through the jacket of the crystallizer too many nuclei and too many fine crystals would be grown and it would be impossible to obtain a large enough yield of well washed crystals upon the subsequent separation in the centrifugals.

When the magma in the crystallizer is ready for spinning, it is discharged into the centrifugal separator or spinner S—1 and subjected to the usual spinning and washing. The crystal cake, after subsequent drying and pulverizing will be found to have a dextrose purity in excess of 99% and the yield of dextrose will range from 50% to 60% of the total dextrose contained in the crystallizer batch, figured on a dry basis.

The hydrol discharged from the centrifugal S—1 will be delivered to the tank HYD—1 while, preferably, all of the wash water will be delivered, as indicated by the line W—1, and mingled with redissolved dextrose produced by the second stage of crystallization, as hereinafter described. This mixture of wash water and dissolved dextrose will be decolorized in any well known manner and returned to the tank T—1 where it is mixed with quantities of original starch conversion liquor for passage through the first stage of crystallization.

The above described process steps comprise the first stage, while the second stage will now be discussed. A pump P—1 will deliver the hydrol accumulated in the tank HYD—1 to a tank R or other suitable apparatus where it will be subjected to reconversion in order to change some of the partially converted substances then present into dextrose. The acid conversion process above mentioned may be utilized for this purpose. Following the reconversion of the liquor under consideration it will then be subjected to the customary decolorization and delivered into the tank T—2. In this tank it is mixed with a water solution of dextrose sodium chloride, the source of which will be explained hereinafter. The amount of dextrose sodium chloride which is mixed in the tank T—2 with the reconverted hydrol should be in such a proportion that from the resulting mixture pure dextrose may be crystallized, under efficient crystallization practice. Should an excess of the double salt be added, there would be found, along with the dextrose crystals separating from the solution, some dextrose sodium chloride crystals, which would be undesirable. In practice we have found that it is safe to add the double salt in about the proportion of 70 pounds of the double salt, calculated on a dry basis, to about 100 pounds of the dextrose contained in the reconverted liquor, also calculated on a dry basis. Of course, a smaller proportion of the double salt may be added if desired, but where the entire process produces a considerable amount of the double salt, efficient operation calls for adding as much of the double salt into the tank T—2 as can be done consistent with the purpose of producing pure dextrose from the second stage.

The combined mixture of reconverted liquor and the dextrose sodium chloride solution, in proper proportions, may then be introduced into the evaporator E—2 and concentrated to about 40.8° Bé. Of course, the density may be varied somewhat from that figure but in the present process the indicated figure will in general give the most efficient results. After the liquor has been suitably concentrated, as indicated, it is then delivered into the cooler C—2 and cooled, preferably quickly, down to a temperature ranging from 117° to 122° F., after which it may be delivered then into the crystallizer X—2. Prior to the introduction of the concentrated liquor into the crystallizer X—2, a quantity of seed in about the proportion which is employed in the first stage, having been left in the crystallizer X—2 from a previous batch, is subjected to agitation for about two hours before the crystallizer is filled, while water ranging from 108° to 110° F. is circulated through the jacket of the crystallizer to assure that the seed will have a temperature fairly close to the temperature of the concentrated liquor about to be introduced. After the crystallizer has been filled the procedure for agitation and use of cooling water in the jacket of the crystallizer will be substantially the same as has been described in regard to the crystallization period in the first stage, except that the period for maintaining the crystallizing magma above 110° F. during the early stage of crystallization may be shortened from three to two days, after which the temperature may be gradually lowered with the aid of the circulating water down to about 90° to 95° F.

The crystallizing period in the second stage lasts about six to eight days, at the end of which time the magma will be in good condition for purging and it then may be introduced into the spinner S—2 and subjected to the usual spinning operation. The crystal cake obtained in this spinner, if it were washed in the customary manner, would have a purity in excess of 99% dextrose, and could be dried and mixed with and sold along with the dextrose produced by the first stage, but it is preferred to dissolve it in the water in the tank D—1, after which it may be then delivered by the pump P—2 and decolorized and returned along with the wash water from the first stage back to the tank T—1. The hydrol discharged from spinner S—2 will be delivered into the tank HYD—2.

As the purpose of the third stage is to produce the double salt, dextrose sodium chloride, there will be added into the tank HYD—2 common salt, sodium chloride, in whatever amount is necessary to provide in the liquor pumped to the third crystallizer 16 parts of NaCl to 100 parts of reducing sugars, calculated as dextrose. There is, of course, some salt already present in the hydrol delivered from the spinner S—2 and other salt may be present as a result of washings or other products of the process which may be sent to the tank HYD—2.

The liquor in tank HYD—2, containing the proper proportions of sodium chloride, will then be delivered by the pump P—3 into the evaporator E—3 in the third stage, where it will be concentrated to about 44.5° Bé. After suitable concentration of the liquor in the evaporator E—3, it is cooled in the cooler C—3 to about 120° F. and then introduced into the crystallizer X—3. Preferably, seed in about the proportion used in the first and second stages is likewise used in the third stage crystallization, but the temperature of the water circulating through the cooling jacket may be lower. In fact 100° F. water in the crystallizer jacket is used preferably during the first twenty-four hours after filling of the crystallizer and subsequently the cooling water is reduced in temperature down to about 72° F., remaining at that temperature at least during the last three days. In view of the higher density of the crystallizing mass in the third stage, the agitator should be kept running continuously. The third stage crystallization requires about six days also before a good purgeable magma is produced. The crystalline product is, of course, dextrose sodium chloride and will be separated in the spinner S—3 and the cake dropped into the tank SOD—1 where it is mixed with sufficient water to completely dissolve the dextrose sodium chloride, thus causing the dissociation of the double salt. This solution is then delivered by means of the pump P—4 into the tank T—2, being subjected to vegetable carbon filtration in transit. In the tank T—2 it is mixed with the hydrol from the first stage in the proportions heretofore described. Thus the dextrose which is procured in the third stage in the form of a double salt is returned to the second stage and from it is recovered pure dextrose.

The wash water employed for washing the cake in the spinner S—3 will preferably be sent to the tank HYD—2 while the hydrol may then be taken out of the process or, if it is desired to recrystallize the same, the hydrol may then be accumulated in the tank HYD—3 and delivered by pump P—5 into the fourth crystallization stage herein indicated. In the latter event, this hydrol will be sent to the evaporator E—4 and subjected to substantially the same evaporating, cooling and crystallizing practice as has just been described for the operation of the third stage, the evaporator E—4, the cooler C—4, the crystallizer X—4 and the spinner S—4, being indicated for use in this stage. On account of the high percentage of impurities which may be expected in the sodium dextrose chloride cake produced from the fourth stage, this cake should be sent preferably to the tank HYD—2 to be dissolved and sent through the third stage. The hydrol from the fourth stage, having a very low dextrose content, may then be discarded from the process.

The above described process is capable of being operated on a commercial basis to yield an amount of pure crystallized dextrose from the first stage which will range from 50% to 60% of the total amount of dextrose delivered from the crystallizer X—1 to the spinner S—1. The second stage should yield a quantity of pure dextrose equivalent to about 35% to 45% of the dextrose content of the liquor passing through the first stage so that the first and second stages which yield pure dextrose should make it possible to produce a total yield of 90% to 95% of the dextrose content of the starch conversion liquor being processed. This unusually high recovery of dextrose can be obtained by careful manipulation of the various stages, adhering closely to the temperature control and densities set forth. The hydrol resulting from the first stage is, of course, more thoroughly exhausted of its dextrose content than has been the usual practice heretofore. In fact, it is so low in dextrose that recrystallization of the hydrol alone would be very inefficient, but, by the aid of reconversion and the addition of dissolved dextrose sodium chloride to the reconverted hydrol, the second stage is made to produce a further large yield of dextrose which would not be possible without the combination of these two features.

The hydrol from the second stage will have such a low dextrose content and such a considerable sodium chloride content that the most efficient way to extract further dextrose from it is to produce, as described, the double salt which the third stage is intended to yield and subsequently separate the dextrose from the double salt.

The process further is so designed that even employing only three stages of crystallization, that is, two to produce pure dextrose and one to produce dextrose sodium chloride, the process may be so manipulated that all of the double salt produced may be returned into the process, that is, so that there will be no excess of the double salt which this process is incapable of utilizing. In order to obtain this proper balance, the washing of the crystalline cake in the spinner S—3 may be increased or decreased in order to wash away more or less of the finer crystals as well as impurities. While increased washing does remove some dextrose combined with sodium chloride, yet this loss of dextrose is offset by the greater freedom from impurities of the double salt which is returned into the second stage.

The modified form of the process shown in Fig. 2 differs from the process of Fig. 1 principally in the fact that in the modified process the dextrose which is produced in the second stage is not dissolved in water and returned to the first stage to be recrystallized again. Rather, the crystal cake produced in the second stage is subjected to sufficient washing for the removal of impurities until the remaining dextrose has a purity equal to the purity of the dextrose produced in the first stage, that is, better than 99% and usually better than 99.5%. While the yield of dextrose from the second stage is diminished somewhat by the thorough washings, the dextrose which is washed away is, of course, not lost but is returned to the second stage.

In the modified form of the process, the temperatures and densities used in each of the crystallization stages is preferably the same as the temperatures and densities employed in the corresponding stages in the process of Fig. 1, as described above. Purified original starch converted liquor, together with decolorized wash water in the first stage is collected in the tank T'—1 and sent through the evaporator E'—1, the cooler C'—1 and crystallizer X'—1. The crystal cake from the first stage, after suitable washing, is sent to the driers and is ready for use as pure dextrose having a purity easily capable of being in excess of 99.5%. The wash water is returned through the first stage while the hydrol going to the tank HYD'—1 is sent by pump P'—1 to a reconverter R', after which this hyrol, in combination with wash water from the second stage, is decolorized and delivered to the tank T'—2. In this tank the dextrose sodium chloride solution is added for the purpose and in the proportions described for the corresponding step of the Fig. 1 process. The second stage apparatus consisting of the evaporator E'—2, C'—2 and X'—2 and the centrifugal separator S'—2 are then employed in the usual manner and the crystal cake, after suitable washing, is a high purity dextrose having a purity easily in excess of 99.5% and may be mixed with the product of the first stage and sent to the driers. The wash water from the second stage delivered into the tank W—2 is decolorized and returned through the second stage.

The third stage operates on the hydrol from the second stage, together with the necessary added amount of sodium chloride to give a solution which, upon evaporation in E'—3 and cooling in C'—3 and crystallization in X'—3, will yield dextrose sodium chloride crystals, corresponding to the third stage of Fig. 1. This crystal cake should be dissolved in water in the tank SOD—1 and sent through a vegetable carbon filter F and thence back to the second stage.

If desired, a fourth stage of crystallization, as indicated, may be employed to produce another yield of dextrose sodium chloride from the hydrol from the third stage, in which case the crystal cake would preferably be sent to the tank HYD'—2, as indicated, to be passed through the third stage for further purification. However, if one does not care to use the fourth stage, the hydrol from the third stage may be taken out of the process.

Either the process of Fig. 1 or Fig. 2 will enable one to obtain a yield of more than 90% of the total available dextrose in the original converted liquor.

The amount of dextrose which may be crystallized and separated from each stage in the process of Fig. 2 is substantially the same as for the corresponding stages of the process of Fig. 1.

The instructions given above for the operation of the invention in either of its two forms are sufficient so that, with the exercise of knowledge common in the art at the present time and by the use of the customary care, no difficulty should be experienced in obtaining the exceptionally high yield which this invention now makes possible. It will be recognized and perceived by those skilled in the art that some variations, however, in the matter of densities and temperature control may be used or permitted within the scope of the invention.

Having shown and described our invention, we claim:

1. In the manufacture of crystalline hydrate dextrose, the improvement consisting in concentrating an impure dextrose containing solution to about 40° Bé., cooling the same to about 120° F., introducing the cooled solution into a crystallizer provided with an agitator and mixing it with seed left therein from a preceding batch in an amount equal to about 3 to 5% of the capacity of the crystallizer and conducting the crystallization of the liquor for about the first three days at a temperature range between 120° F. and 110° F., and completing the crystallization by lowering the temperature from 110° F. to about 100° F.

2. In the manufacture of a crystalline hydrate dextrose from impure dextrose containing solutions, seeding in a water jacketed crystallizing tank a body of said solution having a density of 40° Bé. and a temperature of about 120° F., the seed employed being a magma left in the crystallizer from a preceding batch and in the amount of about 3 to 5% of the capacity of the crystallizer and maintaining the solution temperature above 110° F. for about the first three days while circulating warm water at about 110° F. through the jacket to slowly withdraw the residual heat and exothermic heat of crystallization as the crystals develop until the supersaturation of the solution is diminished enough to permit lowering of the temperature below 110° F. without promoting any substantial additional growth of new crystal nuclei.

3. In the manufacture of a crystalline hydrate dextrose from impure dextrose containing solutions, the method which comprises seeding in a water-jacketed crystallizing tank a solution of about 40° Bé. having a temperature of about 120° F., the seed employed being a magma left in the crystallizer from a preceding batch and in the amount of about 3 to 5% of the capacity of the crystallizer regulating the temperature of the solution thereafter by circulating water through the crystallizer jacket at a temperature slightly below the solution temperature but above 108° F. to maintain the solution above 110° F. during about the first three days of the crystallizing period, and in the remainder of said period gradually lowering the water temperature to cool the solution gradually down to about 100° F.

4. In the manufacture of hydrate dextrose from a starch conversion solution having a dextrose content of about 90%, a method comprising evaporating the solution to about 40° Bé., cooling the same to about 120° F. before seeding, seeding the solution at a temperature above 110° F. with a preheated dextrose hydrate magma having such an elevated temperature as to avoid any substantial chilling of the solution, maintaining the temperature of the solution during about the first three days of the crystallizing period above 110° F., thereafter gradually cooling the solution to below 100° F. to complete the desired crystal growth, and separating the crystals from the liquor.

5. In the manufacturing of hydrate dextrose from a starch conversion solution having a dextrose content of about 90%, a method comprising evaporating the solution to about 40° Bé., cooling the same to about 120° F. before seeding, seeding the solution at a temperature above 110° F. with a preheated dextrose hydrate magma in amount equal to about 3 to 5 per cent of the volume of the solution being crystallized having such an elevated temperature as to avoid any substantial chilling of the solution, maintaining the temperature of the solution during the first three days of the crystallizing period above 110° F., thereafter gradually cooling the solution to below 100° F. to complete the desired crystal growth, and separating the crystals from the liquor.

6. In the manufacture of hydrate dextrose from a starch conversion solution having a dextrose content of about 90%, a method comprising evaporating the solution to about 40° Bé., cooling the same to about 120° F. before seeding, seeding the solution at a temperature above 110° F. with a preheated dextrose hydrate magma having such an elevated temperature as to avoid any substantial chilling of the solution, gradually lowering the temperature of the solution from about 120° to 110° F. during about the first three days of the period while the crystals are developing, thereafter gradually cooling the solution to below 100° F. to complete the desired crystal growth, and separating the crystals from the liquor.

7. In the manufacture of crystalline hydrate dextrose from impure dextrose containing solutions, the method which comprises evaporating the solution to about 40° Bé., cooling the same to about 120° F., seeding the solution with magma left in a crystallizer from a preceding batch to initiate crystallization while holding the temperature well above 110° F. and dropping the temperature therebelow only in the latter half of the crystallizing period, separating the crystals from the liquor, reconverting the hydrol and mixing the same with a solution of dextrose sodium chloride in proportions to yield upon subsequent crystallization dextrose crystals only, subjecting said mixture to the same seeding and crystallizing procedure as hereinabove defined, separating the crystals from the magma thus produced, and extracting further dextrose from the second hydrol in the form of dextrose sodium chloride, the whole of the dextrose sodium chloride thus produced being added to the reconverted first hydrol as above stated and in the proportion defined to crystallize dextrose therefrom.

8. In the manufacture of crystalline hydrate dextrose, the improvement consisting in concentrating an impure dextrose containing solution to about 40° Bé., cooling the same to a temperature range of 122° to 117° F., introducing the cooled solution into a crystallizer provided with an agitator and mixing it with a small amount of seed left therein from a preceding batch consisting of less than 5% of the capacity of the crystallizer, maintaining the crystallizing liquor for about the first three days at a temperature above 110° F., and for the remainder of the crystallizing period gradually lowering the temperature to about 100° F. or lower.

9. In the manufacture of a crystalline hydrate dextrose from impure dextrose containing solutions, the improvement which consists in concentrating the solution to about 40° Bé., cooling the same to a temperature of 120° F. or slightly above, introducing the cooled solution into a crystallizer having an agitator and mixing it with seed in an amount not over 5% of the batch and remaining therein from a preceding batch, the seed prior to mixing having a temperature of 108° F. or higher to avoid chilling the added liquor, regulating the temperature of the liquor during about the first three days of the crystallizing period to maintain it well above 110° F. to retard the growth of an undue number of fine crystals, and thereafter during the remainder of the crystallizing period lowering the temperature of the crystallizing mass, completing the crystallization and separating the crystallized dextrose from the magma.

10. In the manufacture of crystalline hydrate dextrose from impure dextrose containing solutions, the method which comprises evaporating the solution to about 40° Bé., introducing the concentrated liquor into a crystallizer while at a temperature of 120° F. or slightly above and mixing it with seed left therein from a preceding batch, maintaining the temperature of the crystallizing magma well above 110° F. during about the first three days of the crystallizing period and gradually reducing it thereafter, separating the crystals from the liquor, adding dextrose sodium chloride to the resultant hydrol in such proportion as to yield upon subsequent crystallization of the mixture dextrose crystals only and seeding the batch with a small amount of seed remaining from a preceding batch, effecting crystallization of the batch and separating the dextrose crystals therefrom and crystallizing dextrose sodium chloride from the remaining hydrol at a density of 44° Bé. or higher, and utilizing the dextrose sodium chloride thus crystallized for mixing with the first hydrol as above stated.

ROSCOE C. WAGNER.
PAUL L. STERN.